Figure 1:
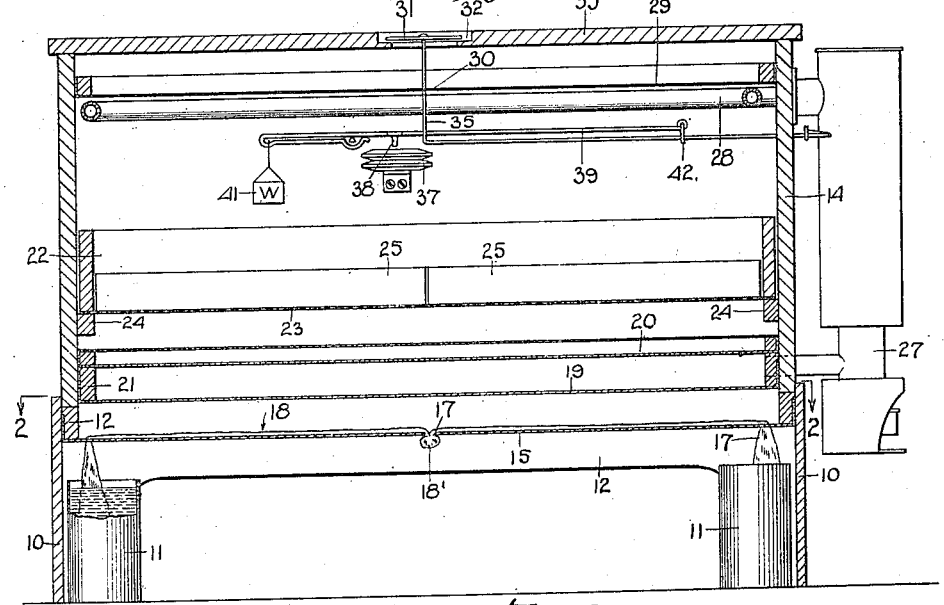

J. W. SACHSE.
INCUBATOR.
APPLICATION FILED DEC. 30, 1914.

1,182,713.

Patented May 9, 1916.
2 SHEETS—SHEET 1.

WITNESSES
F. D. Sweet
Geo. L. Beeler

INVENTOR
Julius W. Sachse
BY Mann & Co
ATTORNEYS

J. W. SACHSE.
INCUBATOR.
APPLICATION FILED DEC. 30, 1914.
1,182,713.
Patented May 9, 1916.
2 SHEETS—SHEET 2.
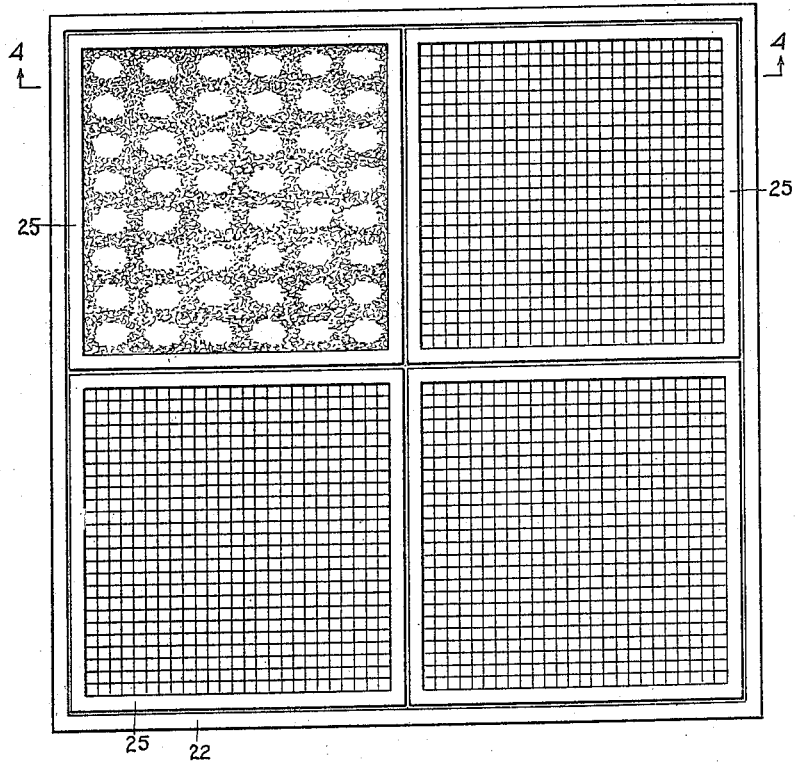
Fig. 3
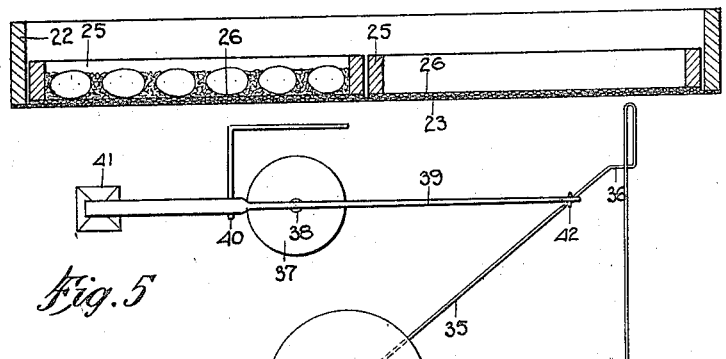
Fig. 4
Fig. 5
WITNESSES
F. D. Sweet
Geo. L. Beeler
INVENTOR
Julius W. Sachse
BY
ATTORNEYS

UNITED STATES PATENT OFFICE.

JULIUS W. SACHSE, OF SHAWNEE, OKLAHOMA.

INCUBATOR.

1,182,713.        Specification of Letters Patent.        Patented May 9, 1916.

Application filed December 30, 1914. Serial No. 879,674.

*To all whom it may concern:*

Be it known that I, JULIUS W. SACHSE, a citizen of the United States, and a resident of Shawnee, in the county of Pottawatomie and State of Oklahoma, have invented a new and Improved Incubator, of which the following is a full, clear, and exact description.

This invention relates to incubators, and has particular reference to novel means for moistening and controlling the turning of the eggs.

Among the objects of the invention, therefore, is to improve the construction of an incubator with respect to the means for supplying moisture in a regular uniform manner to the bottom thereof, whereby the lower half of each egg is maintained suitably cool while the other half thereof is maintained warm, simulating in a high degree the natural method of incubation as when a hen steals her nest away and the eggs are subjected to more or less intimate contact with the cool ground.

Another object of the invention is to regulate in a thorough and satisfactory manner the passage of currents of air upwardly through the egg trays.

The foregoing and other objects of the invention will hereinafter be more fully described and claimed and illustrated in the drawings forming a part of this specification in which like characters of reference indicate corresponding parts in all the views, and in which—

Figure 2:
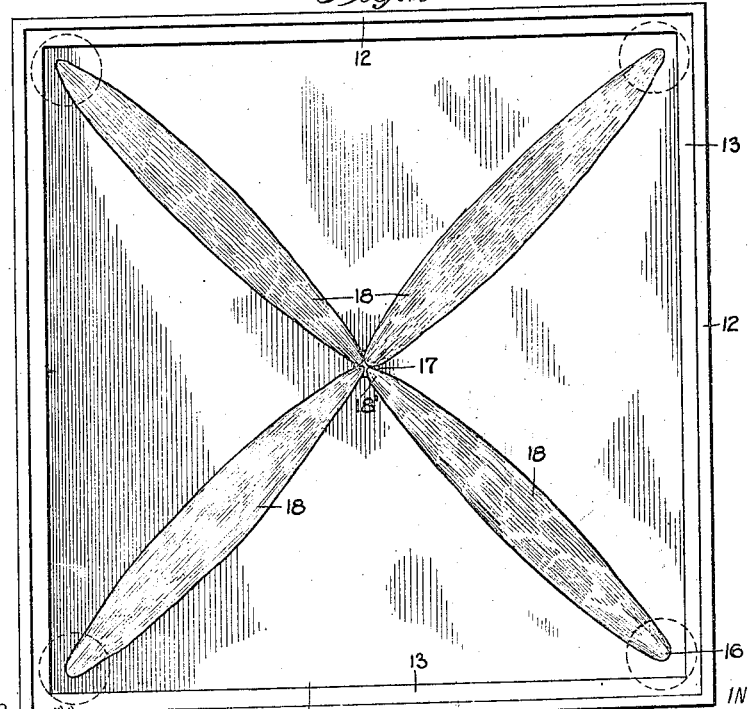

Figure 1 is a vertical transverse section of a preferred embodiment of my invention; Fig. 2 is a plan view of the base as seen from the line 2—2 of Fig. 1; Fig. 3 is a plan view of the tray construction; Fig. 4 is a sectional view on the line 4—4 of Fig. 3; and Fig. 5 is a diagrammatic plan view of the thermostat.

The several parts of this device may be made of any suitable materials, and the relative sizes and proportions, as well as the general design of the mechanism, may be varied to a considerable extent without departing from the spirit of the invention hereinafter more fully described and specifically claimed.

Referring more particularly to the drawings I show a substantially rectangular base including legs 10 of a suitable length to receive within them receptacles 11 for water, and said legs are connected by frame elements 12 suitably rabbeted or formed as indicated at 13 to receive the lower edge or bottom of the main casing or body 14 of the incubator. The base has stretched across it in a horizontal plane a layer of muslin or other suitable fabric 15, the edges of which are secured firmly along the frame rails 12. This horizontal curtain 15 is provided in each of the four corners with a hole 16 and also a hole 17 in its center through which strips of wicking material 18 extend. The extreme ends of the wicks 18, as shown in Fig. 1, dip into the receptacles 11 and cause the water therefrom to be drawn in small and gradual quantities to the curtain 15 or above it, whence it is distributed through the lower portion of the incubator body 14. Any excess of moisture which may be drawn up in this manner by capillarity may drop from the central ends 18' of the wicks which project downwardly through the hole 17. The base structure is such that for storage or shipping purposes the lower half of the body 14 will nest snugly within the base when the latter is inverted, the lower edge of the body coming thus against the lower surface of the curtain 15. Within the lower portion of the body 14 are arranged other horizontal layers or curtains 19 and 20 of fabric such as muslin or the like, through both of which the moisture from the wicks and lowermost curtain must pass before it comes into proximity with the egg trays. Ample fresh air is provided, therefore, for ventilation without any possibility of a draft from the open space below or within the base. These curtains 19 and 20 have their edges secured to and held by a set of strips 21 extending around the inner walls of the body. It will be understood that the body, as heretofore made, may be of any suitable insulating material or of a double composition with suitably packed air spaces. Such features, however, being old, are not illustrated.

The egg holding facilities include a main tray 22 having a reticulated bottom 23 and supported upon strips or cleats 24 on opposite sides of the body. It will be understood that as heretofore the body is provided with openings in the front through which access may be had to the parts within. Any suitable number of smaller trays 25 may be provided to hold and manipulate the eggs, the number shown herein being four of the smaller trays 25 to fit within the main tray 22, an extra tray 25, however, being provided for the purpose of turning the eggs. Each tray 25 is provided with its own reticulated bottom 26 of material such as a wire screen or the like, and the eggs put therein are packed in suitable loose material such as straw cut in half inch lengths, chaff, sawdust, cork chips or the like. This loose packing material provides a layer through which currents of moisture or warmth cannot pass freely in either direction, whereby the upper and lower portions of the eggs are maintained in marked differences of temperature or condition. This loose packing furthermore supplies a means for handling or turning the eggs with safety, keeping them well protected from damage against one another or against the parts of the machine. In turning the eggs the fifth small tray 25 is placed directly over another tray which is filled with eggs, and while held in proper relation to each other the two trays are turned over, transferring the eggs from one tray to the other while the loose bedding for the eggs falls over the tops of the eggs in the new tray. A settling or brushing of the hand applied to this bedding brings it in proper place again in the new tray. The then empty tray is used in turn with the next tray of eggs and so on throughout the series. The turning of the eggs is therefore rapidly and safely accomplished.

Any suitable means may be used to supply heat to the interior of the body 14. I show for this purpose a lamp 27 which supplies heat either through air pipes or by means of hot water as indicated at 28. The pipes shown are arranged in substantially horizontal planes close beneath the top of the body, and just above the same is arranged a fabric curtain 29 having a hole in the center at 30.

A valve 31 guards an opening 32 in the top 33 of the body and to said valve is connected a rod 35 which extends vertically through said hole 30. The rod 35 is of peculiar form as shown in Fig. 5, the main portion of which is journaled in a horizontal bearing at 36 in one of the side walls of the machine near one of the rear corners. At 37 is shown a wafer or the expansible portion of a thermostat, and while the lower portion thereof is fixed in position the upper portion, due to increase of heat, extends upwardly contacting against the point 38 of a bar 39 pivoted on the knife-edge bearing 40 secured to the rear wall of the body. The opposite or free end of the bar 39 may support a counterbalance weight 41 to equalize the weight of the opposite end of the bar having a link 42 connecting it to the lever 35. When the thermostat wafer expands, the bar 39 will lift up the lever 35 and valve 31 allowing the warm air to escape from within the body through the curtain 29. The curtain 29 is useful especially for the purpose of equalizing the currents of warm or cold air which might otherwise damage the eggs and harm the hatch.

The auxiliary trays referred to above provide a means for giving a better change of position or condition of the eggs than is usual for the reason that each of the individual trays may be swung about so as to bring an inner corner or side of the tray of eggs to the outside, and thereby I secure a better result than if the eggs be turned simply and without being shifted about with respect to the location in the machine.

I claim:

1. In an incubator, the combination of a base including a horizontal curtain, wicking material supported upon said curtain and extending therethrough, a moisture receptacle, said wicking material being adapted to receive moisture from the receptacle and convey it by capillarity to and above the curtain, and means above the base to support the eggs.

2. In an incubator, the combination of a base, a curtain of fabric carried thereby in a horizontal position and having holes therethrough, moisture supply means below the curtain, wicking supported by said curtain and extending through the holes for lifting by capillarity moisture from said supply means and conveying it to the curtain, egg supporting means above the base, and a plurality of spaced curtains between the first mentioned curtain and the egg supporting means, substantially as set forth.

3. In an incubator, the combination with a body and means to supply heat and moisture to the upper and lower portions thereof respectively, of egg supporting trays comprising one large tray fitted within the body and a plurality of smaller trays, each tray having a reticulated bottom and each smaller tray being provided with loose dry packing material in which the eggs are loosely embedded, the smaller trays being loosely fitted within the larger tray.

In testimony whereof I have signed my name to this specification in the presence of two subscribing witnesses.

JULIUS W. SACHSE.

Witnesses:
CHAS. EFFINGER,
C. E. CROSE.